Dec. 8, 1936.  S. W. SPARKS  2,063,528
METHOD OF MAKING VALVE BODIES
Filed Jan. 27, 1934  2 Sheets-Sheet 1
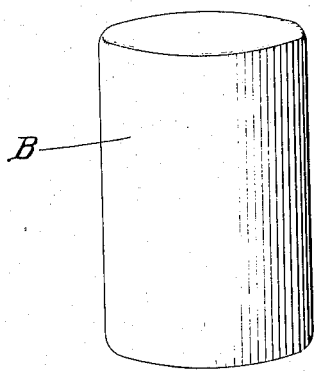
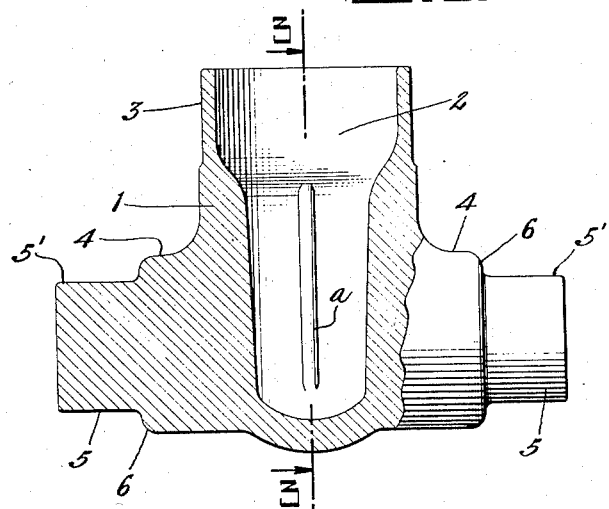
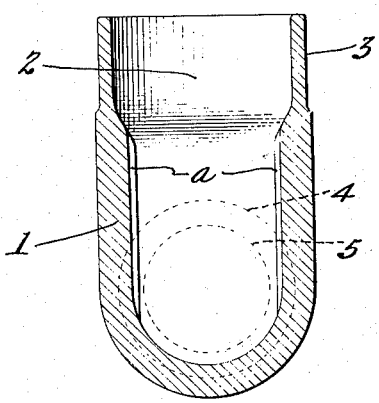
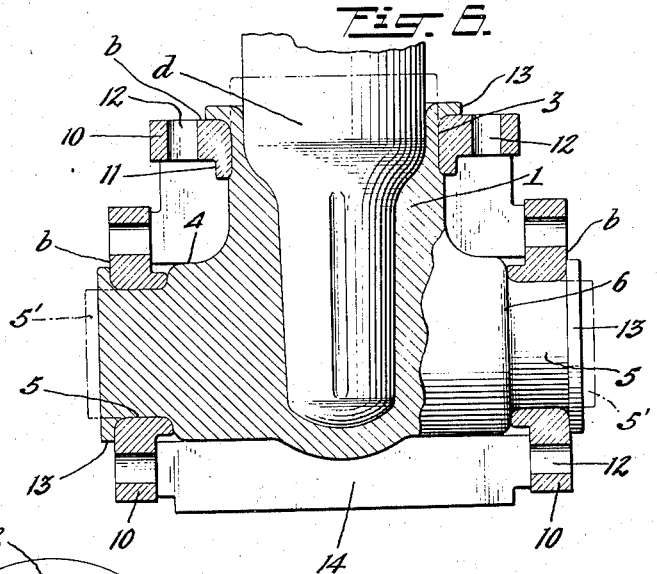
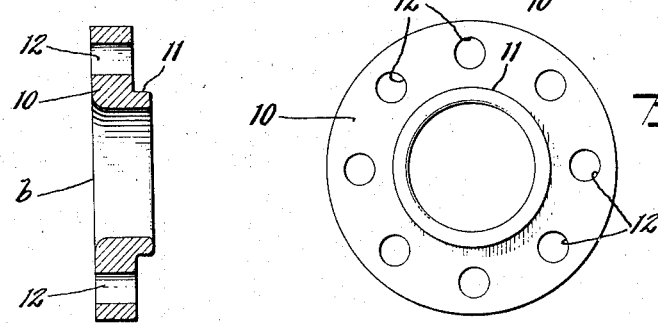
INVENTOR:
Stanley W Sparks,
BY
HIS ATTORNEY.

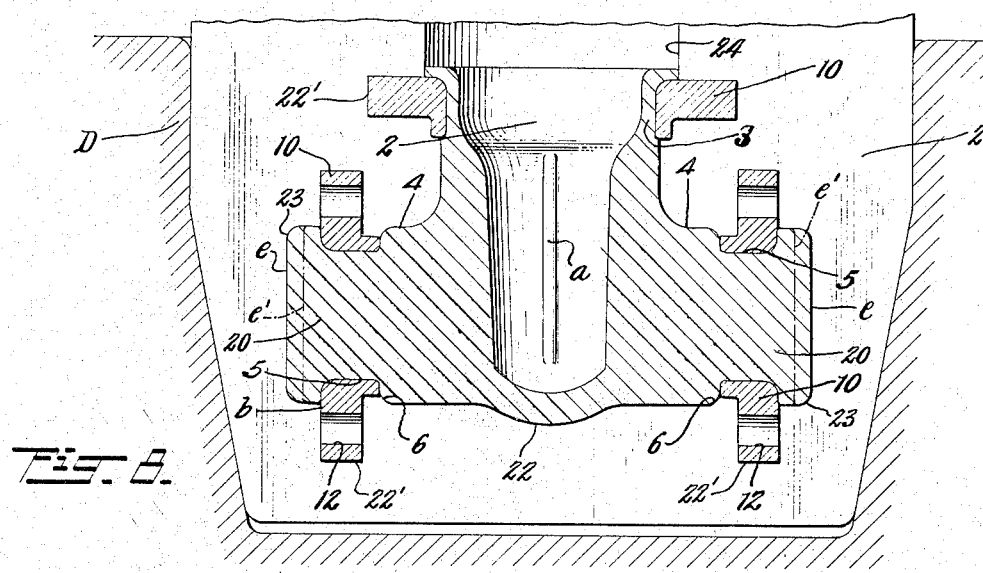
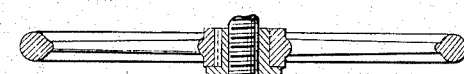
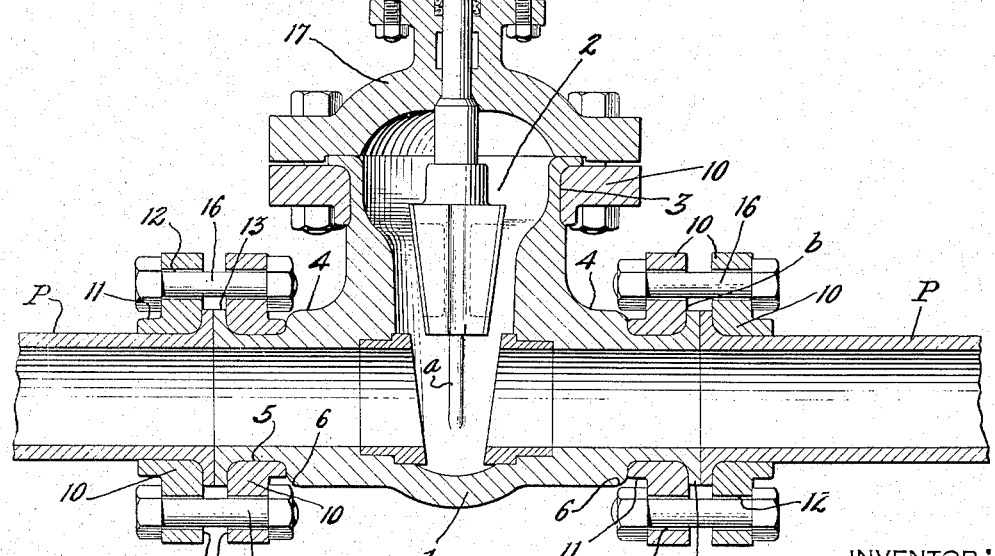
INVENTOR:
Stanley W. Sparks
BY
W. Swenarton
His ATTORNEY.

Patented Dec. 8, 1936

2,063,528

UNITED STATES PATENT OFFICE 2,063,528

METHOD OF MAKING VALVE BODIES

Stanley W. Sparks, Norwalk, Conn., assignor to Sparks Processes, Incorporated, Norwalk, Conn., a corporation of Connecticut Application January 27, 1934, Serial No. 708,545

11 Claims. (Cl. 29—157.1)

My invention is directed primarily to the production of multi-fluid way, valve casings or so-called valve bodies having the hubs and ground terminal sealing faces integral with the body, and separate, but permanently attached, coupling flanges. It has for its principal objects the expeditious production, at a minimum of cost, of such valve bodies that are light in weight, but unusually sturdy and highly resistant to distortion and permanent set, and which bodies are therefore peculiarly adapted for high pressure and high temperature duty in refineries, power plants, chemical works and the like. Furthermore, the invention relates to such valve bodies adapted to be formed either by an extrusion, a drop forging or casting operation.

Heretofore, as I am well aware, it has been proposed to form integral, pipe-connecting, terminal coupling flanges on valve bodies by an upsetting or rolling operation conducted on the valve body after the same has otherwise been completely shaped with the exception of such flanges. However, it was impossible by such upsetting method to manufacture satisfactory valves having perfect coupling flanges in those cases where the valve was required to be of light weight but unusually strong so as to be suitable for heavy duty in refineries and the like, since it is a well recognized rule in forging practice that the thickness of the upset terminal flange must not exceed about three times the original thickness of the metal from which such flange was formed, as otherwise serious imperfections in the flange will be developed as a result of such upsetting operation. In the case of wrought iron even the aforesaid rule of 3 to 1 is excessive.

My investigations have led to the discovery that a valve, superior from the standpoint of lightness in weight, strength, freedom from distortion and permanent set under high pressure and temperature duty, and possessing none of the aforesaid defects such as heretofore encountered, can be expeditiously and economically manufactured with pipe-connecting coupling flanges of any desired face dimensions provided the same is constructed in the manner hereinafter set forth in detail in the following description and drawings forming a part of this specification, in which:

Figure 1 is an elevation of a billet suitable for the production of my improved valve body;

Fig. 2 is a vertical section, partly in elevation, of a rough forging or intermediate shape produced from such billet;

Fig. 3 is a vertical section on the line 3—3 of Fig. 2;

Fig. 4 is a vertical section and Fig. 5 is a rear elevation of the type of hubbed coupling flange which is applied in accordance with my invention to said intermediate shape;

Fig. 6 is a vertical section of the complete valve body showing the manner in which the hubbed coupling flanges are applied thereto and showing one of the halves of the split die for supporting the valve during the application of the flanges;

Fig. 7 is a vertical section of the finished valve showing the same connected into a pressure line; and Fig. 8 is a vertical section of an incomplete valve body, but showing a modification of my invention.

Referring to the drawings and the construction shown therein, the reference numeral 1 designates a rough forging or intermediate shape which is produced from a billet, such as the billet B, by an extrusion, forging or casting operation. Said shape has a central valve chamber 2, the wall of the upper end of which is of reduced wall thickness to form an upwardly projecting neck. The body proper of said shape has integral hubs 4, the outer end portion 5 of each of which is reduced in cross-section, thereby forming an intermediate annular shoulder 6. Gate guides a, the same constituting vertical grooves, are preferably formed on the two opposing faces of the inner wall of the chamber 2.

Coupling flanges 10, preferably having hubs 11 and bolt-receiving apertures 12, are applied, as shown in Fig. 6, to said intermediate shape and thereupon the reduced neck portion 3 of the valve chamber wall and the extreme ends 5' of the reduced hub sections 5 are marginally upset over the outer faces b of the respective applied flanges to form integral retaining flares 13, the same being accomplished either by an upsetting or suitable rolling operation, and during which operation the said flanges are suitably supported in the split-die 14 in order to relieve the pressure of the hubs and valve body proper from the pressure applied during such upsetting operation. Bolts 16, which are inserted through the aforesaid apertures 12, serve to lock the valve flanges 10 to the corresponding flanges 10 on the pipe P and to a bonnet 17, respectively, in the same manner that it is customary to lock the abutting ends of two pipes equipped with the so-called Vanstone type of flange joint in order to insure a pressure-tight fit between the abutting sealing faces of such pipes.

During the application of the flanges 10 to the intermediate shape, it is desirable, in order to more effectively prevent any possibility of distortion of the body, that the walls of the valve chamber be supported by returning thereto the forming tool, such as the tool d which was employed to produce such chamber. Also as shown, it is desirable that the hub portions of the valve should be left solid until after the completion of the upsetting operation and the permanent application of the flanges 10, at which time the fluid ways are drilled therein.

As shown in Fig. 8, my improved valve construction also lends itself to production in a single heat extrusion operation, thereby eliminating the expense and labor involved in the aforesaid method wherein the intermediate shape is re-heated and is then, following the application of the pipe-connecting coupling flanges to the hubs and the terminal neck of the body, positioned in a supporting split-die and therein subjected to successive upsetting operations to form the integral flange-retaining flares. In such single heat extrusion method, the pipe connecting flanges 10 either having the bolt-receiving apertures already drilled therein or undrilled, as desired, are permanently locked on the hubs and terminal body neck during the actual extrusion operation. In order to accomplish such extrusion method an intermediate shape 20 is extruded in a split die 21 that is positioned in a die-pot D with the two halves of such die suitably locked together during the actual extrusion operation. Said die, when the two halves are so locked together, provides a main extrusion chamber 22 generally corresponding to the exact shape of the finished body desired, except that branch or supplemental recesses 22' and 23 are provided which communicate with the main recess, said recesses 22' being adapted to receive the flanges 10, which are fitted thereinto prior to the closing of the two halves of the die together, and said recesses 23 being adapted to permit of the extrusion of abnormally long hub portions, the extreme ends e of which are subsequently removed by a machining or facing operation so that such hubs are shortened to the extent indicated by the reference letter e' which represents the terminal face of the respective finished hubs prior to the drilling of the fluid ways therethrough. The upper end of the extrusion chamber 22 is enlarged, as indicated by the reference numeral 24, to admit of the reception of an upsetting tool which is attached to the plunger of the extrusion press employed, in lieu of the extrusion tool d previously mounted thereon, immediately after the extrusion operation is completed by such extrusion tool and which upsetting tool, upon a subsequent stroke of the plunger, upsets the top flange-retaining flare over the top body flange 10, which is positioned in the die, all without necessitating the re-heating of the extruded valve body or the previous removal of the body from the die. In generally the same manner that the pipe-connecting flanges are applied in situ to the valve body during the extrusion thereof, such flanges can be applied to the valve body in situ during the casting thereof. This is accomplished by providing a sand or other suitable mold formed from a pattern corresponding to the finished body desired and having so-called core prints formed in such mold that are adapted to receive the flanges 10 which are inserted therein prior to the closing of the cope and drag portions thereof together and to receive the terminal portions e of the hubs that are produced in the casting operation conducted in such mold. Following the completion of the casting operation the terminal portions e of the hubs are machined off to the extent indicated by the reference letter e.

The separate, permanently applied flanges should be, in order to realize the utmost advantage from my invention, of an internal diameter such that they will have a snug fit upon the reduced portion of the hubs beyond the shoulders 6, since thereby the applied flanges serve as compression rings, as it were, to effectively reinforce the extreme ends of the hub which are the very portions thereof that in use are subjected to the greatest stresses.

When casting a valve body in a mold in which the pipe-connecting flanges are inserted in core prints formed in said mold, which flanges, where a cast steel valve body is being produced, should be formed of extruded or forged steel, as distinguished from steel flanges. The core prints should be so formed as to admit of the exposure of the lower portion of the outer face of each flange which is to be engaged by the terminal flange-retaining flared portion of each hub. Preferably the exposed faces of the flange so inserted in the core prints are coated with a suitable core wash to facilitate the flow of the metal thereover and also to prevent permanent union of the metal in the outer adjacent surface of each hub with the metal on the inner periphery of the central apertures of each flange.

My invention is peculiarly adapted for the production of metal valves, whether of steel, iron, wrought iron or various ferrous metal alloys and also of non-ferrous metals, such as bronze, aluminum and the like, either by an extrusion, forging or casting operation.

The reduction of the outer ends of the hub member so as to reduce the wall thickness from the extreme end thereof clear back to the shoulder 6, which is adapted to engage the rear face of the applied flanges 10, so that such reduced wall thickness substantially corresponds to the wall thickness of a standard pipe of an internal chamber of the size of the fluid ways is of the utmost importance. In the first place, it insures that the overall diameter of the upset end will not be so great as to prevent the matching up of drilled flanges so applied to the hubs (see Fig. 7) with the flanges carried by pipes corresponding in size to the fluid ways of the body. In the second place, it provides a flange-retaining terminal flared portion that extends across a much greater area of the outer face of the applied flange than would be obtainable were the hub of uniform cross-section, except at the extreme end thereof which was to be upset.

By employing a method and a valve body construction, such as herein described, it is possible to also extrude highly satisfactory wrought iron valve bodies which are extremely resistant to corrosion and yet have unusually strong, separately applied, steel pipe-connecting flanges permanently attached to the wrought iron hubs of the body.

My improved valve body is peculiarly adapted for high pressure and temperature duty in refineries and power plants since, owing to the fact that the flanges are separate from, though permanently attached to the hubs, there will be far less likelihood of the valve body becoming distorted or deformed from twisting or compression stresses imparted from hot, high pressure pipe lines into which the valve is connected, as the mere fact that the flanges are separate admits of just the necessary flexibility between the flange faces and the outer rims of the hubs. Furthermore, my improved valve can be conveniently applied in a vertical position or other desired position to integral flanges of pipes in refineries whenever such flanges have become rotated from their original position, since the flanges of my valve body can be rotated to match the bolt-receiving apertures thereof with those of the flanges carried by such pipes.

In carrying out the extrusion of an ordinary carbon steel valve body in accordance with my invention, it is highly desirable that the blank, such as a billet or ingot, be heated to a plastic condition, for example from 2350° to 2450° F. and well below a melting temperature.

Various modifications and departures from the construction and method of operation, within the scope of the appended claims, may be made without departing from the spirit of my invention.

Having thus described my invention, what I claim and desire to obtain by United States Letters Patent is:—

1. The method of making a valve body, which comprises positioning a coupling flange within a die of the general internal configuration of the particular valve body desired, introducing a plastic metal blank into said die and therein subjecting the same to the extrusion pressure exerted by a plunger caused to contact with said blank and causing the extrusion of portions of said metal blank through the central aperture of such flange and across a portion of the outer face of such flange thereby forming a terminal flange-retaining flared portion on the resultant extruded valve body which permanently retains said applied flange thereon.

2. The method of casting a valve body with integral sealing faces, which comprises forming a mold from a pattern of the general configuration of the valve body desired, forming annular core prints encircling the respective hub-forming cavities of said mold, inserting coupling flanges in said core prints and then pouring the mold and casting a metal valve body in such a manner as to cause the flowing metal to penetrate through the central apertures of said flanges and to flow across a portion of the outer faces thereof, to retain the flange on the body and to form sealing faces as an integral part of the valve body.

3. The method of forming a wrought iron valve body, which comprises extruding a valve body of the desired shape and having integral hubs projecting therefrom, which hubs have integral flared terminal portions, and permanently attaching coupling flanges to said hubs during the extrusion of the latter.

4. The method of making a metal valve body with integral sealing faces, which comprises subjecting a mass of metal from which the desired valve body is to be produced and while the same is heated to a high temperature, to a forming operation, whereby the hot metal is caused to flow and assume the shape of the valve body desired and in which shape the hubs are formed as an integral part of such body and, during such forming operation, effecting the permanent attachment of a separately formed flange to the upper end of the body and the formation of sealing faces integral with the valve body.

5. The method of making a metal valve body having integral hub members and integral sealing face, which comprises introducing a mass of hot metal heated to a high temperature, and at least high enough to render the metal plastic, into a chamber of a configuration the same as that of such desired valve body and, while confining said metal in such chamber, causing the metal to completely fill such chamber and assume the shape thereof and to thereby form a valve body having integral hub members, and during the formation of such valve body in such chamber, effecting the permanent attachment of a separately formed coupling flange to the upper end and effecting the formation of sealing face upon the valve body during the formation of the latter.

6. The method of making a valve body with a plurality of coupling flanges, which comprises positioning coupling flanges within a die of the general internal configuration of the particular valve body desired, introducing a plastic metal blank into said die and therein subjecting the same to the extrusion pressure exerted by a plunger caused to contact with said blank and causing the extrusion of portions of said metal blank through the central aperture of each flange and across a portion of the outer face of each flange thereby forming coupling flange-retaining flared portions on the resultant extruded valve body which permanently retain said applied flanges thereon.

7. The method of making a valve body with an integral sealing face which comprises positioning a coupling flange within a die of the general internal configuration of the particular valve body desired, introducing a plastic metal blank into said die and therein subjecting the same to the extrusion pressure exerted by a plunger caused to contact with said blank and causing the extrusion of portions of said metal blank through the central aperture of such flange and across a portion of the outer face of such flange thereby forming a coupling flange-retaining flared portion on the resultant extruded valve body which permanently retains said applied flange thereon and concurrently forming a sealing face integral with the valve body.

8. The method of making a valve body with a plurality of integral sealing faces, which comprises positioning coupling flanges within a die of the general internal configuration of the particular valve body desired, introducing a plastic metal blank into said die and therein subjecting the same to the extrusion pressure exerted by a plunger caused to contact with said blank and causing the extrusion of portions of said metal blank through the central aperture of such flanges and across a portion of the outer face of each flange thereby forming coupling flange-retaining flared portions on the resultant extruded valve body which permanently retain said applied flanges thereon, and of concurrently forming sealing faces integral with the valve body.

9. The method of forming a wrought iron valve body with integral sealing faces, which comprises extruding a valve body of the desired shape and having integral hubs projecting therefrom, which hubs have integral flared terminal portions, and permanently attaching forged steel flanges to said hubs, and concurrently forming an integral sealing face on said hubs during the extrusion of the latter.

10. The method of forming a metal valve body with integral sealing faces, which comprises forming the valve body, exclusive of pipe-connecting flanges, by a casting operation and during such casting operation forming hub portions through and upon outer faces of snug fitting flange members with those sections of the casting upon the outer faces of the flange members forming sealing faces as an integral part of the valve body, said flange members having central hub-receiving apertures of substantially smaller inside diameter than the outside diameter of the cast ends of said hubs engaged thereby.

11. The method of forming a metal valve body with an integral sealing face which comprises forming the valve body, exclusive of a connecting flange member, by a casting operation and during such casting operation forming a hub portion through and upon the outer face of a snug fitting flange member with that section upon the outer face forming a sealing face as an integral part of the valve body, said flange member having a central hub receiving aperture of substantially smaller inside diameter than the outside diameter of the cast end of the hub engaged thereby.

STANLEY W. SPARKS.